April 8, 1958          H. E. TEMPLE          2,829,758
CONVEYOR SYSTEM WITH ARTICLE TRANSFERRING APPARATUS
Original Filed Oct. 27, 1951          4 Sheets-Sheet 2

INVENTOR.
HIRAM E. TEMPLE
BY
Otto Moeller
Attorney

INVENTOR.
HIRAM E. TEMPLE

BY Otto Moeller
Attorney

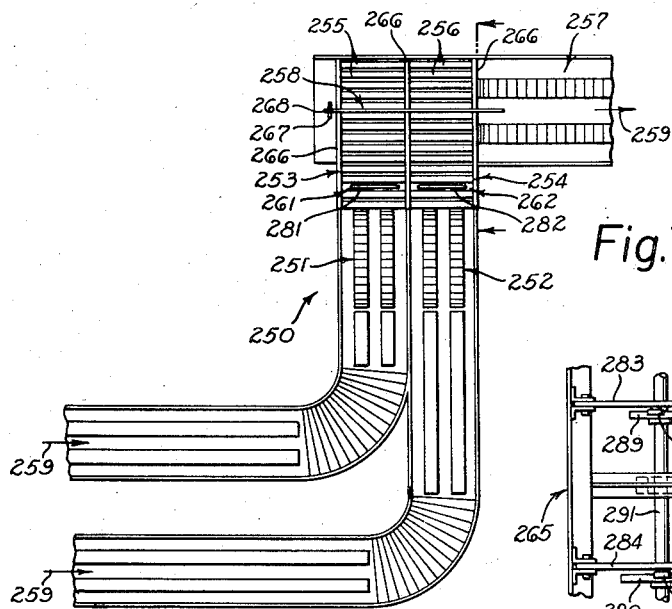
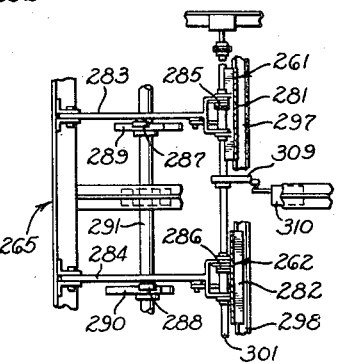
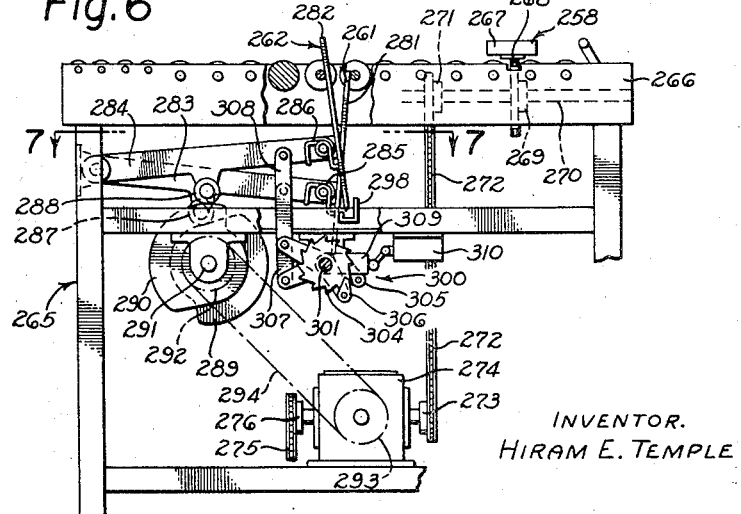

United States Patent Office 2,829,758
Patented Apr. 8, 1958

2,829,758

CONVEYOR SYSTEM WITH ARTICLE TRANS-FERRING APPARATUS

Hiram E. Temple, York, Pa., assignor, by mesne assignments, to Capital Products Corporation, a corporation of Pennsylvania Original application October 27, 1951, Serial No. 253,525, now Patent No. 2,762,487, dated September 11, 1956. Divided and this application August 21, 1956, Serial No. 605,255

2 Claims. (Cl. 198—32)

The present invention relates in general to conveyor systems and, more particularly, to a conveyor system having inlet and outlet conveyors arranged at right angles and having transfer means movable transversely of the inlet conveyor and in the direction of movement of the outlet conveyor for transferring successive articles from the inlet conveyor to the outlet conveyor. While the invention finds particular utility in the baking industry for handling such articles as baking pans or pan straps, for example, and is considered hereinafter in such connection as a matter of convenience, it will be understood that the invention is also susceptible of other applications and that I do not intend to be limited to the specific applications considered hereinafter.

A primary object of the invention is to provide a conveyor system of the character hereinbefore suggested which includes escapement means associated with the inlet conveyor upstream from the transfer means for passing but one article at a time to the transfer means and which includes actuating means operatively connected to the transfer means and the escapement means for operating the transfer means and the escapement means in timed relation. A related object is to provide an escapement means which includes a gate movable between an extended position wherein it is disposed in the path of an article being transported by the inlet conveyor and a retracted position wherein it is disposed out of such path, the gate being moved between its extended and retracted positions in timed relation with the operation of the transfer means.

Another object is to provide means associated with the escapement means for spacing an article being passed by the escapement means from a following article.

Another object is to provide an inlet conveyor having a section which includes spaced rolls, or other spaced conveyor elements, and to provide a transfer means which includes an endless chain having an upper run between such rolls and carrying a sweep for moving an article engaged thereby from the inlet conveyor to the outlet conveyor.

Another object is to provide means for preventing retraction of the gate of the escapement means when no article is being pressed against the gate by the inlet conveyor. Such means for preventing retraction of the gate when no article is pressing thereagainst insures feeding articles to the transfer means in timed relation with the operation of the transfer means so that an article cannot strike the transfer means as it is moving across the inlet conveyor, which is an important feature.

Another object is to provide latch means releasable in response to the pressure of an article against the gate of the escapement means for preventing retraction of the gate in the absence of pressure thereagainst by an article on the inlet conveyor.

Another object is to provide a pair of inlet conveyors disposed on opposite sides of an outlet conveyor and running toward the outlet conveyor so that articles may be delivered to the outlet conveyor by both inlet conveyors.

An object in connection with the conveyor system suggested in the preceding paragraph is to provide transfer means for transferring articles from the two inlet conveyors to the outlet conveyor, and to provide two escapement means respectively associated with the inlet conveyors and each adapted to pass one article at a time to the transfer means. A related object is to provide means for operating the two escapement means in alternating relation and in timed relation with the transfer means so that an article is delivered to the transfer means from one inlet conveyor at a time.

Another object in connection with this double-inlet conveyor system is to provide alternately operating stops for intercepting articles passed to the transfer means by the respective escapement means and to provide means for operating said stops in alternating relation and in timed relation with the operation of the two escapement means.

Another object is to provide a conveyor system which includes two inlet conveyors in side-by-side relation and an outlet conveyor extending transversely of the inlet conveyors, such conveyor system including transfer means for transferring articles from the inlet conveyors to the outlet conveyor and including two escapement means respectively associated with the inlet conveyors and operating in alternating relation for passing an article to the transfer means from one of the inlet conveyors at a time.

Another object is to provide counting means for counting the number of articles passed by the escapement means.

The foregoing objects and advantages of the present invention, together with various other objects and advantages thereof which will become apparent, may be attained with the exemplary embodiments of the invention which are described in detail hereinafter and which are illustrated in the accompanying drawings. Referring to the drawings.

Figure 2:
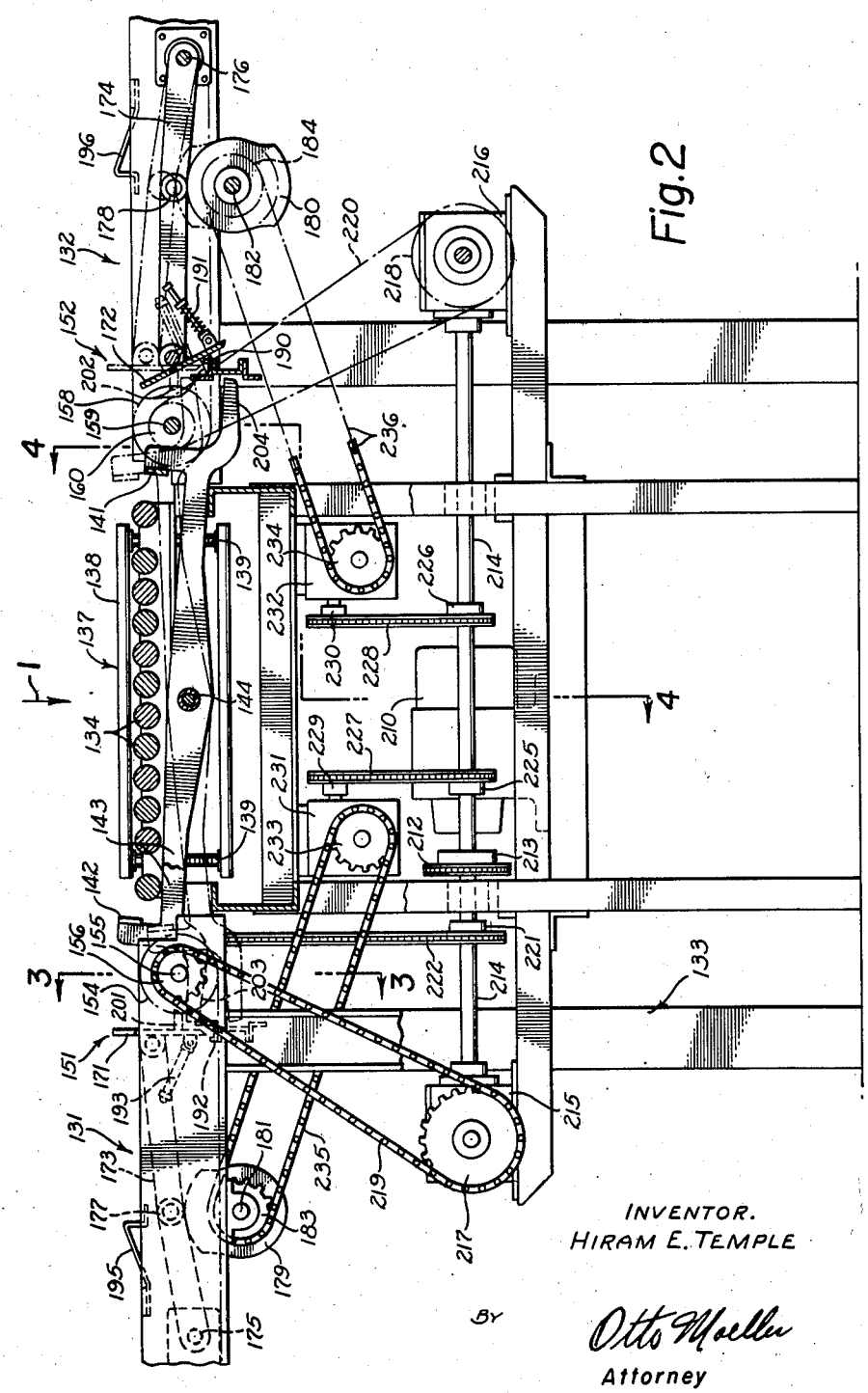
Fig. 2 is a sectional view taken along the arrowed line 2—2 of Fig. 1.
Figure 3:
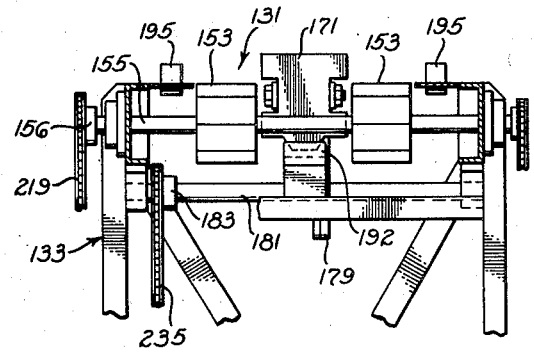
Figure 4:
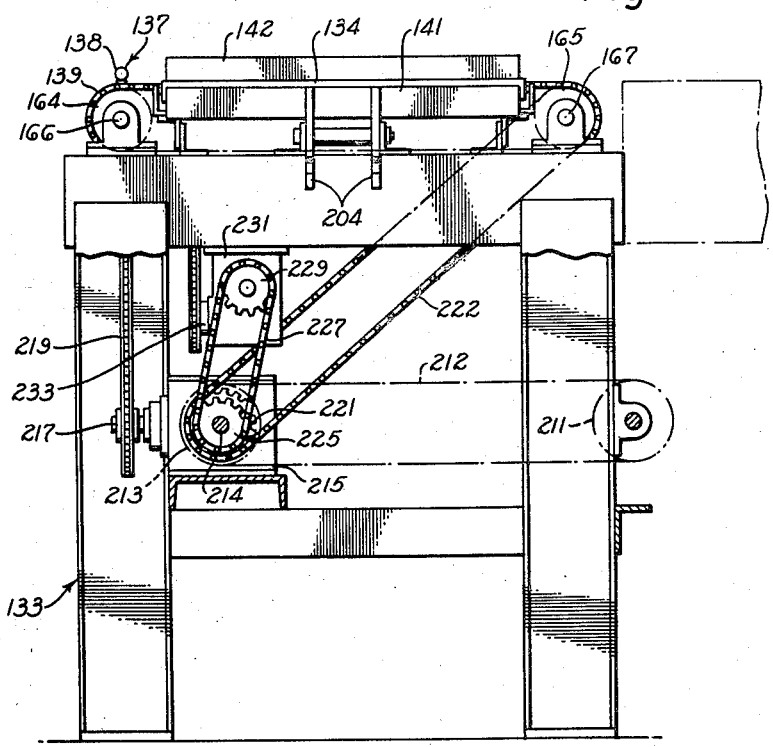

Figs. 3 and 4 are sectional views respectively taken along the arrowed lines 3—3 and 4—4 of Fig. 2;

Fig. 5 is a plan view of another embodiment of the invention;

Fig. 6 is an enlarged, fragmentary sectional view taken along the arrowed line 6—6 of Fig. 5; and Fig. 7 is a fragmentary sectional view taken along the arrowed line 7—7 of Fig. 6.

Figure 1:
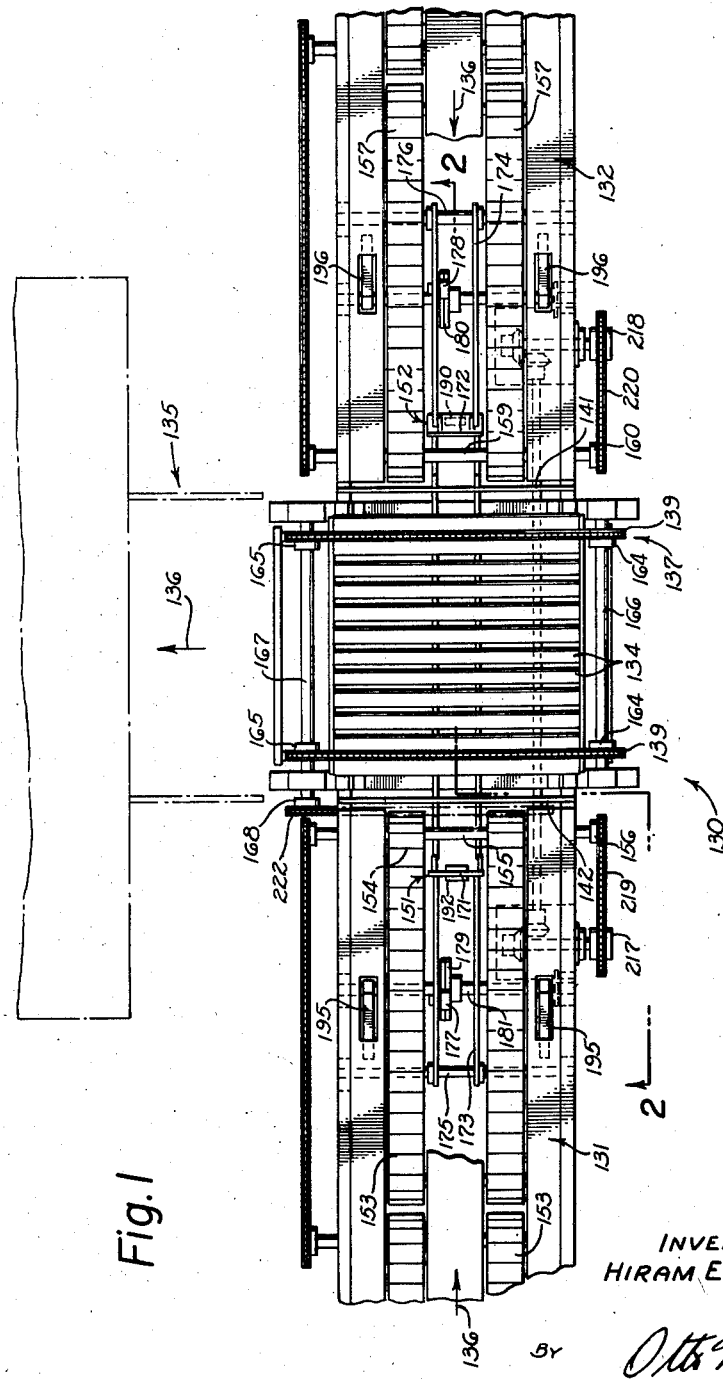
Fig. 1 is a plan view of the conveyor system with article transfer means which embodies the invention.

Referring to Figs. 1 and 4 of the drawings, illustrated therein is a conveyor system 130 of the invention which includes two aligned inlet conveyors 131 and 132 running toward each other, these conveyors being carried by a frame 133. Also carried by the frame and disposed between the two inlet conveyors 131 and 132 are a plurality of gravity or idling rolls 134, the idling rolls being common to the two inlet conveyors and being regarded hereinafter as forming part of each. An article delivered by the inlet conveyor 131 onto the idling rolls 134 has sufficient momentum to move completely onto the idling rolls, the same being true of an article delivered by the inlet conveyor 132. Extending transversely of the inlet conveyors 131 and 132 and registering with the idling rolls 134 thereof is an outlet conveyor 135, the directions of movement of the articles transported by the three conveyors 131, 132 and 135 being as indicated by the arrows 136.

Movable transversely of the inlet conveyors 131 and 132 and in the direction of movement of the outlet conveyor 135 is a transfer means 137 which is illustrated as including one or more sweeps 138 carried by endless chains 139. The upper runs of the chains 139 are disposed between pairs of the idling rolls 134 so that they do not interfere with movement of articles from the inlet conveyors 131 and 132 onto the idling rolls, the sweeps 138 being disposed above the idling rolls during the upper run of their movement.

In order to limit movement of articles delivered to the transfer means 137 by the inlet conveyors 131 and 132, the conveyor system 130 includes stops 141 and 142 which are movable between extended and retracted positions in alternating relation in a manner to be described so that the stop 141 is extended and the stop 142 retracted when an article is delivered by the inlet conveyor 131 and, similarly, the stop 141 is retracted and the stop 142 is extended when an article is delivered by the conveyor 132. The stops 141 and 142 are interconnected by a lever 143 which is pivoted for rocking movement at 144.

Associated with the respective inlet conveyors 131 and 132 upstream from the transfer means 137 are escapement means 151 and 152 each adapted to pass one article at a time to the transfer means. The two escapement means 151 and 152 operate in alternating relation and in timed relation with the stops 141 and 142 and the transfer means 137 so that articles are delivered to the transfer means by the inlet conveyors 131 and 132 in alternating relation.

Considering the conveyor system 130 in more detail, the inlet conveyor 131 includes endless conveying elements 153 trained around a roll or drum 154 which is carried by a shaft 155 journalled in suitable bearings carried by the frame 133, the shaft 155 also carrying a drive sprocket 156. Similarly, the inlet conveyor 132 includes endless conveying elements 157, a drum 158, a shaft 159 and a drive sprocket 160.

The transfer means 137, as hereinbefore suggested, includes two endless chains 139, each chain being trained at one end around a sprocket 164 and at its other end around a sprocket 165. The sprockets 164 are fixed on a shaft 166 journalled in suitable bearings on the frame 133, and the sprockets 165 are carried by a shaft 167 also journalled in suitable bearings on the frame, the shaft 167 also carrying a drive sprocket 168.

The escapement means 151 and 152 respectively associated with the inlet conveyors 131 and 132 respectively include gates 171 and 172 disposed between the conveying elements of the inlet conveyors 131 and 132 and respectively pivotally connected to arms 173 and 174 which are pivotally connected to the frame 133 at 175 and 176, respectively. The arms 173 and 174 carry cam following rollers 177 and 178, respectively, these rollers engaging cams 179 and 180, respectively. The cams 179 and 180 are respectively mounted on shafts 181 and 182 which are journaleld in suitable bearings carried by the frame 133, the shafts 181 and 182 having drive sprockets 183 and 184 thereon, respectively.

As the cams 179 and 180 rotate, they move the gates 171 and 172 between extended and retracted positions. However, the cams 179 and 180 are 180° out of phase so that the gate 171 is extended when the gate 172 is retracted, and vice versa. Thus, the escapement means 151 and 152 operate in alternating relation to pass articles from the inlet conveyors 131 and 132 to the transfer means 137 in alternating relation.

As best shown in Fig. 2, associated with the gate 172 is a latch means for preventing retraction of the gate in the event that no article is pressing thereagainst when the cam 180 rotates into a position to permit retraction of the gate. This latch means includes a latch member 190 which intercepts the gate 172 as it tends to drop toward its retracted position if the gate 172 has not been rotated into an inclined position, shown in solid lines, by the pressure of an article thereagainst. A compression spring 191 engaging the gate 172 acts thereon to bias it toward the broken line position shown in Fig. 2, which position the gate 172 assumes if no article on the conveyor 132 is pressing thereagainst. Consequently, with the gate 172 in the broken line position shown in Fig. 2, if the cam 180 rotates into a position to retract this gate, the latch member 190 intercepts the gate to prevent retraction thereof. Thus, the latch member 190 prevents passage of an article from the conveyor 132 to the transfer means 137 unless the article is bearing against the gate 172 at the proper point in the operating cycle. This prevents an article arriving slightly late from being passed to the transfer means with the possibility that it might strike one of the sweeps 138.

Similar considerations are applicable to the gate 171, this gate being provided with a latching means which is also releasable in response to pressure of an article against the gate, this latching means including a latch member 192 and the gate being biased toward its latched position by a compression spring 193.

In order to prevent articles intercepted by the gates 171 and 172 from bouncing back, and thus failing to exert the pressure against the gates necessary to release the latching means associated therewith, I provide depressible spring clips 195 and 196 respectively spaced from the gates 171 and 172 distances substantially equal to the lengths of articles being handled. As will be apparent, articles encountering the spring clips 195 and 196 will depress same and the spring clips will move upwardly to keep the articles from bouncing back after the articles have passed thereover.

The gates 171 and 172 are provided with lugs 201 and 202, respectively, which are adapted to engage arms 203 and 204, respectively, on the lever 143 carrying the stops 141 and 142. As the gate 171, for example, moves to its retracted position, the lug 201 thereon engages the arm 203 to rock the lever 143 into a position such that the stop 141 for limiting movement of an article delivered by the inlet conveyor 131 is moved to its extended position. Similarly, the stop 142 for limiting movement of an article delivered to the transfer means 137 by the inlet conveyor 132 is moved to its extended position by engagement of the lug 202 on the gate 172 with the arm 204 on the lever 143 when the gate 172 moves to its retracted position. Thus, the stops 141 and 142 are moved between their extended and retracted positions in alternating relation and in timed relation with the alternating operation of the gates 171 and 172. Friction at the pivot 144 for the lever 143 will ordinarily be sufficient to retain the stops 141 and 142 in the desired positions, although additional means, not shown, for this purpose may be provided if desired.

Considering the actuating means for the various elements of the conveyor system 130, it includes an electric motor 210 which drives a sprocket 211, Fig. 4, a chain 212 being trained around the sprocket 211 and around a sprocket 213 on a shaft 214 which is carried by suitable bearings on the frame 133. The shaft 214 drives gear boxes 215 and 216 which, in turn, drive sprockets 217 and 218, respectively. Trained around the sprocket 217 and the drive sprocket 156 for the inlet conveyor 131 is a chain 219, and trained around the sprocket 218 and the drive sprocket 160 for the inlet conveyor 132 is a chain 220. Also carried by the shaft 214 is a sprocket 221 around which is trained a chain 222, this chain also being trained around the drive sprocket 168 for the transfer means 137. The shaft 214 further carries sprockets 225 and 226 around which are trained chains 227 and 228, respectively, these chains being trained around sprockets 229 and 230, respectively, of gear boxes 231 and 232, respectively. These gear boxes drive sprockets 233 and 234, respectively, around which are trained chained 235 and 236, respectively, these chains also being trained around the drive sprockets 183 and 184, respectively, for the cams 179 and 180. Thus, all of the various elements of the conveyor system 130 are driven in timed relation by the motor 210 through the various mechanisms heretofore described.

Considering the over-all operation of the conveyor system 130, it will be assumed that the motor 210 is operating and that files of articles are on the inlet conveyors 131 and 132. With the various elements of the conveyor system in the positions shown in Fig. 2 of the drawings, the gate 172 has been retracted to permit passage of an article to the transfer means 137 to be engaged by one of the sweeps 138 of the transfer means and to be transferred to the outlet conveyor 135. Subsequently, the cam 180 extends the gate 172 to intercept the next article on the conveyor 132 and, at the same time, the cam 179 rotates to a position to retract the gate 171. If an article is pressing against the gate 171, the gate will move past the latch member 192 and into its retracted position to permit passage of the article to the transfer means. Otherwise, the gate 171 will not retract. Thereafter, the cam 179 rotates to a position to extend the gate 171 and the cam 180 moves to a position to permit the gate 172 to retract again, provided an article is pressing thereagainst. If no article is pressing against the gate 172 it will, of course, be prevented from retracting by the latch member 190. Thus, the gates 171 and 172 feed articles to the transfer means 137 in timed relation with the operation of the transfer means, each gate skipping a beat whenever no article is pressing thereagainst at the time its cam permits it to retract.

As each gate moves to its retracted position, it rocks the lever 143 carrying the stops 141 and 142 into a position to bring the corresponding stop into its extended position and the other stop into its retracted position. For example, as the gate 171 moves into its retracted position, it extends the stop 141 for limiting movement of an article delivered to the transfer means by the inlet conveyor 131, and, at the same time, retracts the stop 142 to permit passage of the article thereover. The gate 172 accomplishes the reverse effect.

Thus, the conveyor system 139 alternately transfers articles from the inlet conveyors 131 and 132 to the outlet conveyor 135, this alternating relation obtaining so long as continuous streams of articles arrive at the two escapement means 151 and 152. If there is a gap in one of the streams of articles, the system will continue to transfer articles from the other inlet conveyor to the outlet conveyor until such time as the gap disappears.

Referring to Figs. 5 to 7 of the drawings, illustrated therein is a conveyor system 250 of the invention which includes two inlet conveyors 251 and 252 arranged side by side and respectively including sections 253 and 254 composed of rolls 255 and 256. Registering with the rolls 255 and 256 forming the downstream ends of the inlet conveyor sections 253 and 254 and extending transversely of such inlet conveyor sections is an outlet conveyor 257, the conveyor system 250 including a transfer means 258 movable across the inlet conveyor sections 253 and 254 and in the direction of movement of the outlet conveyor 257 for transferring articles from the inlet conveyors to the outlet conveyor, the directions of movement of the articles being as indicated by arrows 259. Associated with the respective inlet conveyors 251 and 252 upstream from the transfer means 258 are alternately operable escapement means 261 and 262, these escapement means being adapted to pass one article at a time and, as indicated, being alternately operable so that articles are passed one at a time from the inlet conveyors 251 and 252 in alternating relation.

Considering the conveyor system 250 in more detail, it includes a frame 265 having frame members 266 which carry the rolls 255 and 256. The transfer means 258 includes a sweep 267 carried by a chain 268 trained around sprockets 269 only one of which is visible in Fig. 6 of the drawings. The upper run of the chain 268 is disposed between a pair of the rolls 255 and an aligned pair of the rolls 256 and is disposed below the upper surfaces of the rolls so that only the sweep 267 engages the article in the path of the transfer means. One of the sprockets 269 of the transfer means 258 is mounted on a shaft 270 which carries a drive sprocket 271, this drive sprocket having trained therearound a chain 272 which is also trained around a sprocket 273 driven from a gear box 274. The mechanism within the gear box 274 may be driven in any suitable manner, as by a chain 275 trained around a sprocket 276.

The escapement means 261 and 262 respectively include gates 281 and 282 disposed between pairs of the rolls 255 and 256, respectively. The gates 281 and 282 are pivotally mounted on arms 283 and 284, respectively, and are biased counterclockwise by rat trap springs 285 and 286, respectively. The arms 283 and 284 are pivotally connected to the frame 265 and are respectively provided with cam following rollers 287 and 288 which engage cams 289 and 290, respectively, these cams being mounted on a shaft 291 having a drive sprocket 292 which is driven by a sprocket 293 on the gear box 274 through a chain 294. The cams 289 and 290 are 180° out of phase so that the gates 281 and 282 are moved between their extended and retracted positions in alternating relation so as to pass articles from the inlet conveyors 251 and 252 to the transfer means 258 in alternating relation. It will be noted that the transfer means 258 and the two escapement means 261 and 262 are all driven from the same gear box 274 so that they are operated in timed relation.

The gates 281 and 282 are provided with latching means for preventing retraction thereof in the event that no article on the corresponding inlet conveyor is pressing thereagainst, the latching means including latches 297 and 298 into which the respective gates 281 and 282 drop to prevent retraction in the event that the gates are not biased clockwise by articles pressing thereagainst in opposition to the action of the springs 285 and 286.

Considering the over-all operation of the conveyor system 250 as thus far described, it will be assumed that streams of articles are being transported by the inlet conveyors 251 and 252 and that the first article in each stream is pressing against the corresponding one of the gates 281 and 282. Consequently, when the cam 289 rotates to a position to retract the gate 281, the article pressing against this gate biases it clockwise so that it clears the corresponding latch 297 and moves into its retracted position. Consequently, this article passes to the transfer means 258 and is transferred thereby to the outlet conveyor 257. Subsequently, the cam 289 extends the gate 281 again in time to intercept the next article on the inlet conveyor 251, and the cam 290 moves to a position to retract the gate 282. Since an article on the conveyor 252 is pressing against the gate 282, it rotates it clockwise so that the gate clears the corresponding latch 298 and moves into its retracted position to permit passage of the article to the transfer means, which transfers it to the outlet conveyor. This process is repeated over and over again so long as continuous streams of articles are on the inlet conveyors. In the event that there is a gap in one of the streams, the corresponding gate will not retract until such time as the gap disappears. Thus, under such conditions, articles will be passed to the transfer means by the other conveyor only, and at one half the normal rate.

The conveyor system 250 also includes a counting means 300 for counting the number of articles passed by the two escapement means 261 and 262. More particularly, the counting means includes a shaft 301 on which are disposed two ratchet wheels only one of which is visible and is identified by the numeral 304. In the particular construction illustrated, each ratchet wheel is shown as having twelve teeth to provide twelve increments of rotation of the shaft 301. Pawls 305 and 306 are pivoted on the shaft 301 and act on the respective ratchet wheels, these pawls being connected to the gate arms 283 and 284, respectively, by pivoted links 307 and 308, respectively.

The linkages connecting the gate arms 283 and 284 to the pawls 305 and 306 are so designed that each time one of the gates 281 and 282 is retracted, the shaft 301 is rotated 1/12 of a revolution in the particular construction illustrated. Thus, whenever twelve articles are passed by the two escapement means 261 and 262, the shaft 301 is rotated through one complete revolution, it being immaterial whether the two escapement means pass the same number of articles, or different numbers.

Thus, with the construction described, the conveyor system 250 transfers articles to the outlet conveyor 257 in batches of twelve and, when twelve articles have been transferred, the conveyor system may be de-energized until such time as the twelve articles are disposed of by some other apparatus, not shown, such as an oven loading apparatus. For this purpose, the shaft 301 is provided with an arm 309 which opens a switch 310 at the end of each revolution of the shaft 301, which corresponds to a transfer of twelve articles with the particular construction illustrated.

It will be understood that a counting means similar to the counting means 300 may be incorporated in the other embodiment hereinbefore disclosed also if desired.

Although I have disclosed various exemplary embodiments of my invention herein for the purposes of illustration, it will be understood that various changes, modifications and substitutions may be incorporated therein without necessarily departing from the spirit of the invention.

This application is a division of my copending application Serial No. 253,525, filed October 27, 1951, now Patent No. 2,762,487 of September 11, 1956.

I claim as my invention:

1. In a conveyor system, the combination of: first and second inlet conveyors disposed in spaced end to end relation; means for driving said conveyors in a direction for conveying articles toward each other; common transfer means between the delivery ends of said first and second inlet conveyors for receiving articles therefrom and including means for delivering articles from said transfer means in a direction transversely of their movement by said inlet conveyors; first and second escapement means respectively associated with said first and second inlet conveyors upstream from said transfer means for alternately passing articles to said transfer means; a first stop member between the delivery end of said first inlet conveyor and said transfer means movable between an extended position to stop on said transfer means an article delivered by said second inlet conveyor and a retracted position to permit passing of an article from said first inlet conveyor onto said transfer means; a second stop member between the delivery end of said second inlet conveyor and said transfer means movable between an extended position to stop on said transfer means an article delivered by said first inlet conveyor and a retracted position to permit passing of an article from said second inlet conveyor onto said transfer means; means actuatable upon operation of said first escapement means, to pass an article by said first inlet conveyor, for moving said first stop member to retracted position and said second stop member to extended position; and means actuatable upon operation of said second escapement means to pass an article by said second inlet conveyor, for moving said first stop member to extended position and said second stop member to retracted position.

2. In a conveyor system, the combination of: first and second inlet conveyors disposed in spaced end to end relation; means for driving said conveyors in a direction for conveying articles toward each other; common transfer means between the delivery ends of said first and second inlet conveyors for receiving articles therefrom and including means for delivering articles from said transfer means in a direction transversely of their movement by said inlet conveyors; first and second escapement means respectively associated with said first and second inlet conveyors upstream from said transfer means for alternately passing articles to said transfer means; a first stop member between the delivery end of said first inlet conveyor and said transfer means movable between an extended position to stop on said transfer means an article delivered by said second inlet conveyor and a retracted position to permit passing of an article from said first inlet conveyor onto said transfer means; a second stop member between the delivery end of said second inlet conveyor and said transfer means movable between an extended position to stop on said transfer means an article delivered by said first inlet conveyor and a retracted position to permit passing of an article from said second inlet conveyor onto said transfer means; a pivotally mounted lever carrying said stop members at opposite ends thereof, means responsive to movement of said first escapement means to retracted position for pivoting said lever to move said first stop member to retracted position and said second stop member to extended position; and means responsive to movement of said second escapement means to retracted position for pivoting said lever to move said second stop member to retracted position and said first stop member to extended position.

References Cited in the file of this patent

UNITED STATES PATENTS

| | | |
|---|---|---|
| 1,425,557 | Tingwall et al. | Aug. 15, 1922 |
| 1,853,787 | Twomley | Apr. 12, 1932 |
| 1,998,806 | Eggleston | Apr. 23, 1935 |
| 2,320,934 | James et al. | June 1, 1943 |
| 2,732,057 | Temple | Jan. 24, 1956 |